March 14, 1933.    J. W CRUMPACKER    1,901,736
DRIVE SHAFT AND PINION ASSEMBLY PULLER
Filed June 17, 1932
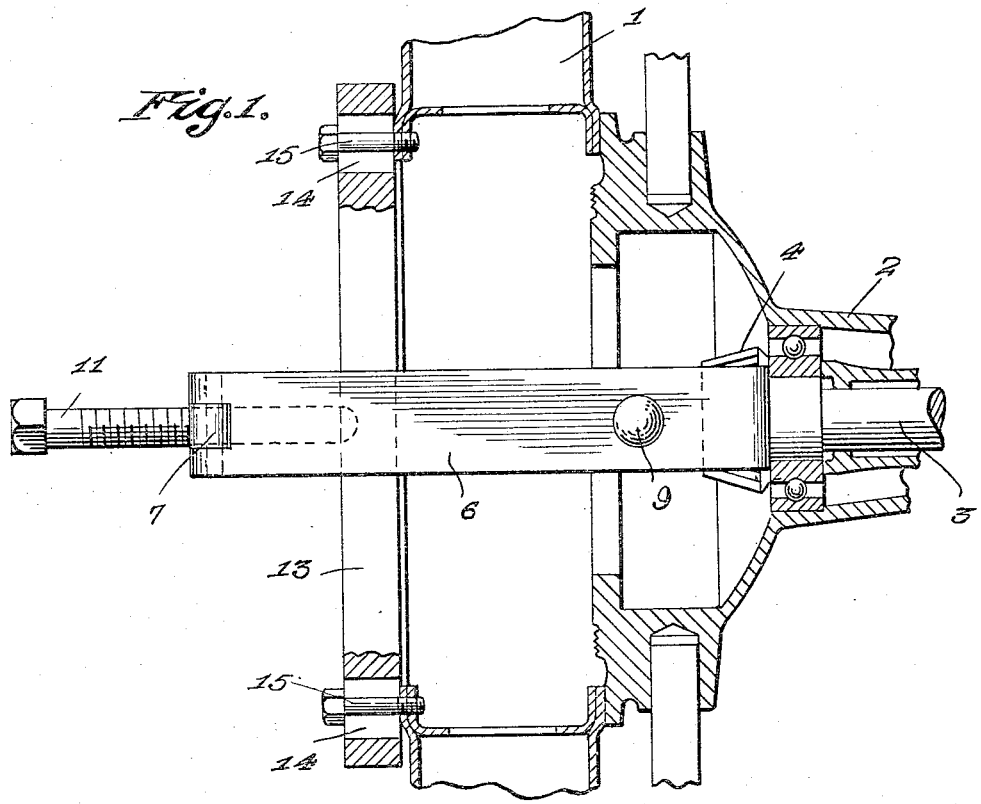
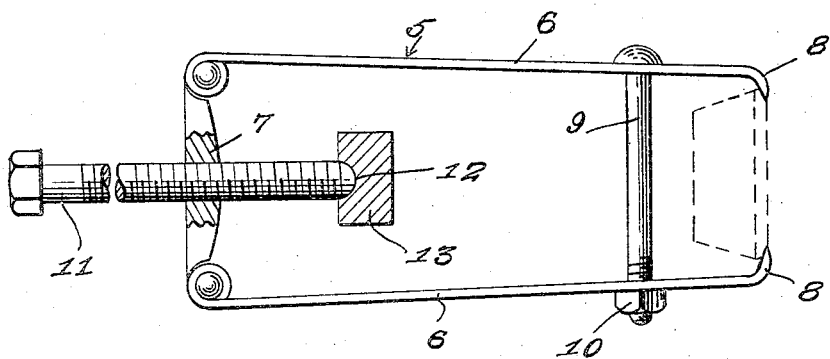
J. W. Crumpacker,
INVENTOR
BY Victor J. Evans & Co.
ATTORNEY Patented Mar. 14, 1933

1,901,736

UNITED STATES PATENT OFFICE

JAMES W. CRUMPACKER, OF HUTCHINSON, KANSAS

DRIVE SHAFT AND PINION ASSEMBLY PULLER

Application filed June 17, 1932. Serial No. 617,857.

This invention relates to tools or pullers especially adapted for use on automobiles of the type employing a torque tube drive and has for the primary object, the provision of a device of the above stated character, whereby the drive shaft may be pulled from the torque tube through the differential housing after the removal of the differential unit and without disconnecting or removing the differential housing from the automobile and disconnecting the universal joint from the transmission housing of the automobile.

With this and other objects in view, this invention consists in certain novel features of construction, combination and arrangement of parts to be hereinafter more fully described and claimed.

For a complete understanding of my invention, reference is to be had to the following description and accompanying drawing, in which Figure 1 is a fragmentary sectional view illustrating a portion of a differential housing and torque tube with a drive shaft therein and having a tool applied and constructed in accordance with my invention for pulling the drive shaft from the torque tube.

Figure 2 is a plan view partly in section illustrating the tool.

Referring in detail to the drawing, the numeral 1 indicates a fragmentary portion of a differential housing which has had the differential unit removed. The differential housing 1 carries a torque tube 2 in which is mounted a drive shaft 3 having the usual drive pinion 4. To remove the drive shaft 3 from the torque tube, a puller or tool 5 is employed and consists of arms 6 pivotally connected to a head 7 and having the free ends bent to form jaws 8 adapted to engage the drive pinion 4 as shown in Figure 1. The arms 6 adjacent the jaws 8 are apertured to receive a bolt 9 having a nut 10 threaded thereto whereby the jaws may be adjusted towards each other for tightly gripping the drive pinion 4. The head 7 is provided with a screw threaded opening to receive an adjusting bolt 11. The adjusting bolt 11 is provided with feed threads meshing with the threads of the opening 7. The bolt 11 is adapted to engage in a socket 12 formed in a bar 13. The bar 13 adjacent its ends is provided with slots 14 to receive bolts or like fasteners 15 threaded to the differential housing after the usual cover plate thereof has been removed. By adjusting the bolt 11 with the jaws 8 applied to the drive pinion 4, the drive shaft 3 may be pulled from the torque tube 2 through the differential housing 1. The removal of the drive shaft 3 in the manner set forth obviates the necessity of disconnecting the usual universal joint which is associated with the forward end of the torque tube and the transmission housing.

While I have shown and described the preferred embodiment of my invention, it will be understood that minor changes in construction, combination and arrangement of parts may be made without departing from the spirit and scope of my invention, as claimed.

Having thus described my invention, what I claim is:—

A puller for removing a pinion from an assembled drive shaft comprising a head, an adjusting bolt threaded to said head, elongated arms hinged at one end to the ends of the head and having their opposite ends curved towards each other to engage a pinion by the arms extending through a differential housing, a fastener adjustably connecting said arms adjacent the curved ends thereof, and an anchoring bar having a recess to receive the adjusting bolt and provided with slots to receive fasteners of the differential housing, said bar extending between the arms.

In testimony whereof I affix my signature.

JAMES W. CRUMPACKER.